(12) United States Patent
Marcondes et al.

(10) Patent No.: US 8,149,826 B2
(45) Date of Patent: Apr. 3, 2012

(54) METHOD AND SYSTEM FOR PROFILING AND LEARNING APPLICATION NETWORKING BEHAVIOR

(75) Inventors: Cesar A. C. Marcondes, Los Angeles, CA (US); Anders D. Persson, San Mateo, CA (US); Darrin P. Johnson, Mountain View, CA (US)

(73) Assignee: Oracle America, Inc., Redwood City, CA (US)

( * ) Notice: Subject to any disclaimer, the term of this patent is extended or adjusted under 35 U.S.C. 154(b) by 1510 days.

(21) Appl. No.: 11/638,891

(22) Filed: Dec. 14, 2006

(65) Prior Publication Data

US 2008/0144527 A1   Jun. 19, 2008

(51) Int. Cl.
*H04L 12/56* (2006.01)
(52) U.S. Cl. ................ 370/389; 706/20; 726/1
(58) Field of Classification Search .......... None
See application file for complete search history.

(56) References Cited

U.S. PATENT DOCUMENTS

| | | | |
|---|---|---|---|
| 7,620,807 B1 * | 11/2009 | Spatscheck et al. | 713/152 |
| 7,660,248 B1 * | 2/2010 | Duffield et al. | 370/230.1 |
| 2003/0005122 A1 * | 1/2003 | Freimuth et al. | 709/225 |
| 2005/0060295 A1 * | 3/2005 | Gould et al. | 707/3 |
| 2005/0102414 A1 * | 5/2005 | Hares et al. | 709/232 |
| 2006/0239219 A1 * | 10/2006 | Haffner et al. | 370/321 |
| 2007/0076606 A1 * | 4/2007 | Olesinski et al. | 370/230 |

* cited by examiner

*Primary Examiner* — Brian Roberts
(74) *Attorney, Agent, or Firm* — Osha • Liang LLP

(57) ABSTRACT

In general, the invention relates to a method for classifying an application. The method includes receiving, at a kernel, a plurality of packets from the application, wherein the application is executing outside of the kernel, obtaining a first measurement from the plurality of packets associated with a first parameter using a first internal estimator in the kernel, applying a first statistical technique to the first measurement to generate a first estimate of the first parameter, and obtaining a classification of the application based on the first estimate. Further, the classification of the application is used to optimize a network connection associated with the application.

20 Claims, 4 Drawing Sheets

METHOD AND SYSTEM FOR PROFILING AND LEARNING APPLICATION NETWORKING BEHAVIOR

CROSS-REFERENCE TO RELATED APPLICATIONS

Subject matter contained herein may be related to subject matter contained in U.S. Pat. No. 7,672,240 entitled: Method and System for Using Bayesian Network Inference for Selection of Transport Protocol Algorithm"; U.S. Pat. No. 7,701,856 entitled "Method and System for Bi-level Congestion Control for Multipath Transport"; U.S. Pat. No. 7,746,901 entitled "Method and System for Offloaded Transport Layer Protocol Switching" U.S. patent application Ser. No. 11/638,858 entitled "Method and System for Network Stack Tuning"; U.S. patent application Ser. No. 11/639,085 entitled "Method and System for Timestamping Data Packets From a Network"; and U.S. Pat. No. 8,000,239 entitled "Method and System for Bandwidth Allocation Using Router Feedback", in the names of the same inventors and having the same assignee as the present application.

BACKGROUND

In the last several years, the Internet has evolved towards widespread sharing of all forms of information. The ease of creating a public website has led to a culture of individual self-publishing and co-operative publishing in the form of blogs, podcasts, wikis, and photo and video sharing. Voice Over Internet Protocol (VoIP) services have allowed the expansion of the Internet's communication capabilities. Sophisticated on-demand content provisioning has enabled the delivery of all forms of media across the Internet, including traditional media forms, such as newspapers, radio, television, and movies. Greater bandwidth has moved traditionally local file backups and mirrors to locations that are accessed over a network. In addition, the Internet's peer-to-peer infrastructure has given rise to real-time data transmission as well as file sharing.

These changes have led to increased heterogeneity of media types and traffic, increased network complexity, reduced latency requirements, and increased bandwidth requirements. Often, network traffic seamlessly transitions through multiple wireless Local Area Network (LAN) standards (e.g., 802.11a, 802.11b, 802.11g, 802.11n), wireless Personal Area Network (PAN) standards such as Bluetooth® (Bluetooth is a registered trademark of Bluetooth Sig, Inc. of Delaware), wired standards such as Ethernet, and even storage area networks (SANs) and any associated network storage protocols. Furthermore, network traffic itself is composed of many different types of data, which are sent using various packet transmission patterns and protocols. For example, streaming video traffic is transmitted using a different protocol from VoIP traffic. Additionally, network applications, from weather simulations and telemetry to streaming media and VoIP, are demanding increased bandwidth and reduced latency from the Internet.

To operate in a heterogeneous, complex environment and meet bandwidth and latency requirements, a network connection is customized to handle different traffic patterns, types of data transmitted, and types of transmission media. However, before customization takes place, the network connection is characterized appropriately. For example, multiple Transmission Control Protocol (TCP) congestion control algorithms exist, with each algorithm designed to handle a particular set of network conditions. However, to effectively use a particular TCP congestion control algorithm, the network conditions are determined, and the appropriate congestion control algorithm is selected for the established network conditions. Mechanisms are also put in place to deal with changing network conditions, traffic patterns, and network usage once the TCP congestion control algorithm is implemented.

SUMMARY

In general, in one aspect, the invention relates to a method for classifying an application. The method includes receiving, at a kernel, a plurality of packets from the application, wherein the application is executing outside of the kernel, obtaining a first measurement from the plurality of packets associated with a first parameter using a first internal estimator in the kernel, applying a first statistical technique to the first measurement to generate a first estimate of the first parameter, and obtaining a classification of the application based on the first estimate, wherein the classification of the application is used to optimize a network connection associated with the application.

In general, in one aspect, the invention relates to a system. The system includes an application configured to send a plurality of packets to a kernel. Further, the kernel comprises a first internal estimator and a classifier, wherein the first internal estimator is associated with a first parameter and configured to: obtain a first measurement from the plurality of packets, wherein the first measurement is associated with the first parameter; and generate a first estimate associated with the first parameter based on the first measurement, wherein the classifier is configured to generate a classification of the application based on the first estimate, and wherein the classification of the application is used to optimize a network connection associated with the application.

In general, in one aspect, the invention relates to a computer readable medium containing software instructions embodied therein for causing a computer system to perform a method for emulating a system call. The method includes receiving, at a kernel, a plurality of packets from the application, wherein the application is executing outside of the kernel, obtaining a first measurement from the plurality of packets associated with a first parameter using a first internal estimator in the kernel, applying a first statistical technique to the first measurement to generate a first estimate of the first parameter, and obtaining a classification of the application based on the first estimate, wherein the classification of the application is used to optimize a network connection associated with the application.

Other aspects of the invention will be apparent from the following description and the appended claims.

DETAILED DESCRIPTION

Figure 1:
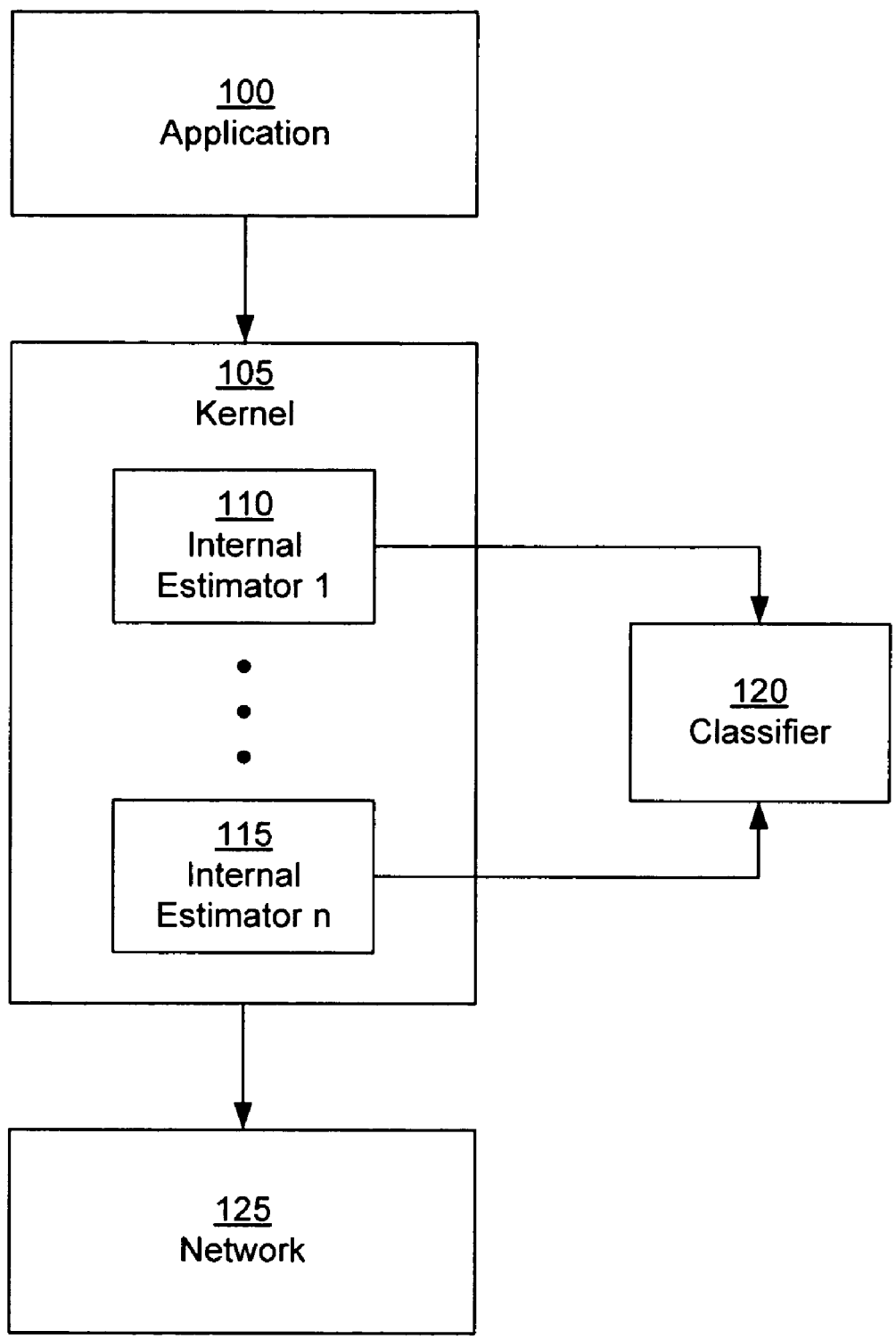
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system to determine the behavior of a network application. In one embodiment of the invention, a network application is an application that sends and receives packets over a network. The packets are used to communicate with another network application on another computer on the network.

Specifically, embodiments of the invention provide a method and system to classify a network application in real-time based on the characteristics of the network traffic sent or received by the network application. In one embodiment of the invention, internal estimators in the kernel are used to collect information about the network traffic before the traffic leaves the system on which the network application is executing, and estimates from the internal estimators are used to classify the network application. The classification of the application may then be used to optimize the network application's network connection(s).

FIG. 1 shows a schematic diagram of a system in accordance with one or more embodiments of the invention. As shown in FIG. 1, the system includes an application (100), a kernel (105), one or more internal estimators (e.g., internal estimator 1 (110), internal estimator 2 (115)), a classifier (120), and a network (125). Each of these components is described in detail below.

In one embodiment of the invention, the application (100) refers to a network application, or an application that access the network (125). In one or more embodiments of the invention, the application (100) sends packets over the network (125) to one or more packet destinations (not shown) on the network (125). In one or more embodiments of the invention, the packets allow the application (100) to communicate with the packet destinations through the network (125). The network (125) may be a local area network (LAN), wide area network (WAN), campus area network (CAN), metropolitan area network (MAN), home area network (HAN), ad hoc network, and/or a wireless network. Examples of network applications (100) include Voice Over Internet Protocol (VoIP) applications, streaming video applications, peer-to-peer applications, File Transfer Protocol (FTP) applications, web browsers, etc.

In one embodiment of the invention, the kernel (105) is a central component of a computer's operating system (OS). The kernel (105) manages the system's resources and the communication between the system's hardware and software components. The kernel (105) also provides the lowest layer of abstraction for the resources, such as memory, processors, and input/output (I/O) devices, used by applications (100) running on the OS. The kernel (105) also executes and provides support for applications (100) on the system. In addition, the kernel (100) may manage a set of peripheral devices (not shown), such as printers, scanners, mice, external storage devices, and other devices that are optional to the normal operation of the system.

In one or more embodiments of the invention, packets from the application (100) are sent to the kernel (105) before being transmitted over the network (125). In one or more embodiments of the invention, the kernel (105) performs transport layer processing on the packets before sending the packets over the network (125). Transport layer processing may include creating a connection between the application (100) and a packet destination (not shown), guaranteeing same order delivery of packets, providing a checksum of packet contents, regulating packet flow between the application (100) and packet destination, and providing a port for the application (100). In one or more embodiments of the invention, transport layer processing may be performed according to the specifications of a transport protocol, such as Transmission Control Protocol (TCP) or User Datagram Protocol (UDP).

In one embodiment of the invention, the kernel (105) also includes one or more internal estimators (e.g., internal estimator 1 (110), internal estimator n (115)). In one or more embodiments of the invention, each internal estimator (e.g., internal estimator 1 (110), internal estimator n (115)) corresponds to a statistical estimator configured to measure data from packets sent by the application (100) as the packets arrive in the kernel (105). Examples of statistical estimators include maximum likelihood estimators, Bayes estimators, minimum mean squared error estimators, best linear unbiased estimators, etc.

In one or more embodiments of the invention, each internal estimator (e.g., internal estimator 1 (110), internal estimator n (115)) is associated with one or more specific characteristics, or parameters, of the network traffic passing through the kernel (105). For example, one internal estimator (e.g., internal estimator 1 (110), internal estimator n (115)) may be responsible for monitoring packet inter-arrival time and inter-arrival type, one internal estimator may be used to monitor memory usage, one internal estimator may be used to monitor packet size, etc. The internal estimators (e.g., internal estimator 1 (110), internal estimator n (115)) make measurements of the packets that are associated with the parameter and produce estimates from the measurements. In one or more embodiments of the invention, an estimate corresponds to a calculated approximation of a result related to the internal estimator's (e.g., internal estimator 1 (110), internal estimator n (115)) associated parameter.

In one or more embodiments of the invention, each internal estimator (e.g., internal estimator 1 (110), internal estimator n (115)) uses one or more statistical techniques to produce estimates from their measurements. In one or more embodiments of the invention, the statistical techniques vary according to the type of estimator used. For example, a maximum likelihood estimator uses the highest value found in a likelihood function to make an estimate, a minimum mean squared error estimator uses the lowest mean squared error function as the basis for the estimate, etc. In one or more embodiments of the invention, constrained histograms are produced from the statistical techniques used by the internal estimators (e.g., internal estimator 1 (110), internal estimator n (115)).

In one or more embodiments of the invention, estimates from the internal estimators (e.g., internal estimator 1 (110), internal estimator n (115)) are sent to the classifier (120). In one or more embodiments of the invention, constrained histograms are also sent from the internal estimators (e.g., internal estimator 1 (110), internal estimator n (115)) to the classifier (120) to aid in classification of the application (100). In one or more embodiments of the invention, constrained histograms are created by the internal estimators (e.g., internal estimator 1 (110), internal estimator n (115)) to store network characteristics, such as packet timestamps or inter-arrival times. In one or more embodiments of the invention, each constrained histogram is created as an array, where each element of the array represents a range of values. For example, each element may represent a range of values for packet inter-arrival times, such as 0-10 ms, 10-50 ms, etc. The value of each element is incremented by one when an inter-arrival time within that range is found. In addition, the ranges may change dynamically based on observed values to better fit the data. The histograms may also be smoothed and additionally constrained to a linear correlation coefficient before being passed to the classifier (120) and/or an external database (not shown) for further analysis.

The classifier (120) then classifies the application (100) based on the estimates and/or constrained histograms. In other words, the application (100) is classified based on an analysis of the network traffic sent to/from the application (100). In one or more embodiments of the invention, the classifier (120) corresponds to a statistical classifier, such as a linear classifier, k-nearest neighbor classifier, neural network, Bayesian network, etc. In one or more embodiments of the invention, the classifier (120) uses one or more statistical techniques, such as principal components analysis (PCA), linear discriminant analysis (LDA), non-linear discriminant analysis, Fisher discriminant analysis, and expectation maximization, to classify the application (100).

In one or more embodiments of the invention, training data is generated by obtaining packets from applications with known classes. For example, packets from VoIP applications, FTP applications, streaming video applications, etc. are obtained. The aforementioned packets may then be used to create internal estimators (e.g., internal estimator 1 (110), internal estimator n (115)) that produce the best estimates of different parameters related to the packets. The estimates from the best internal estimators (e.g., internal estimator 1 (110), internal estimator n (115)) may also be used in the classifier (120). For example, means and covariances for LDA and Fisher discriminant analysis may be obtained from the internal estimators (e.g., internal estimator 1 (110), internal estimator n (115)) and used by the classifier (120) to classify the application (100).

The following is an example of an internal estimator is accordance with one or more embodiments of the invention. The example is not intended to limit the scope of the invention. Turning to the example, an internal estimator (e.g., internal estimator 1 (110), internal estimator n (115)) may be used to estimate the average packet inter-arrival time of an application (100). As a result, the internal estimator (e.g., internal estimator 1 (110), internal estimator n (115)) is configured to measure individual packet arrival times and determine packet spacing. The internal estimator (e.g., internal estimator 1 (110), internal estimator n (115)) may use a timestamp on each packet to determine the packet's arrival time. As an alternative, the internal estimator (e.g., internal estimator 1 (110), internal estimator n (115)) may use a processor clock to obtain more precise indicators of a packet's arrival time and/or determine packet spacing more precisely. In one or more embodiments of the invention, the internal estimator (e.g., internal estimator 1 (110), internal estimator n (115)) analyzes packets as the packets arrive in the kernel (105) en route to the network (125).

Once the internal estimator (e.g., internal estimator 1 (110), internal estimator n (115)) has collected enough data from the packets to make an estimate, the internal estimator applies one or more statistical techniques to analyze the data and obtain one or more estimates from the analysis. As mentioned above, the statistical technique(s) may depend on the type of internal estimator used. For example, a minimum mean squared error estimator produces an estimate that minimizes the mean squared error, a maximum likelihood estimator produces an estimate that maximizes a likelihood function, etc. In one or more embodiments of the invention, the data is fit into a model for different values of the average inter-arrival time, such as 20 ms, 40 ms, and 100 ms. In one or more embodiments of the invention, the model includes a probability mass function of the data given different parameter values. In one or more embodiments of the invention, the parameter value with the best fit (e.g., minimum mean squared error, maximum likelihood, minimum variance, etc.) is selected as the estimate of the parameter. For example, using a maximum likelihood estimator, the inter-arrival time that produces the highest likelihood given the data is selected.

The estimate from the internal estimator (e.g., internal estimator 1 (110), internal estimator n (115)) is sent to the classifier (120) for further analysis. In one or more embodiments of the invention, the estimate is sent with one or more constrained histograms. In one or more embodiments of the invention, external information about the application, such as information known about the application by an administrator, is also sent to the classifier. Further, estimates from other internal estimators (e.g., internal estimator 1 (110), internal estimator n (115)) may also be sent to the classifier (120). For example, another internal estimator (e.g., internal estimator 1 (110), internal estimator n (115)) may make an estimate of the packets' memory usage. The classifier (120) then produces a classification of the application (100) from the estimates, external information, and/or constrained histograms. In one or more embodiments of the invention, the classifier (120) uses one or more statistical techniques, such as PCA or LDA, to classify the application (100).

Figure 2:
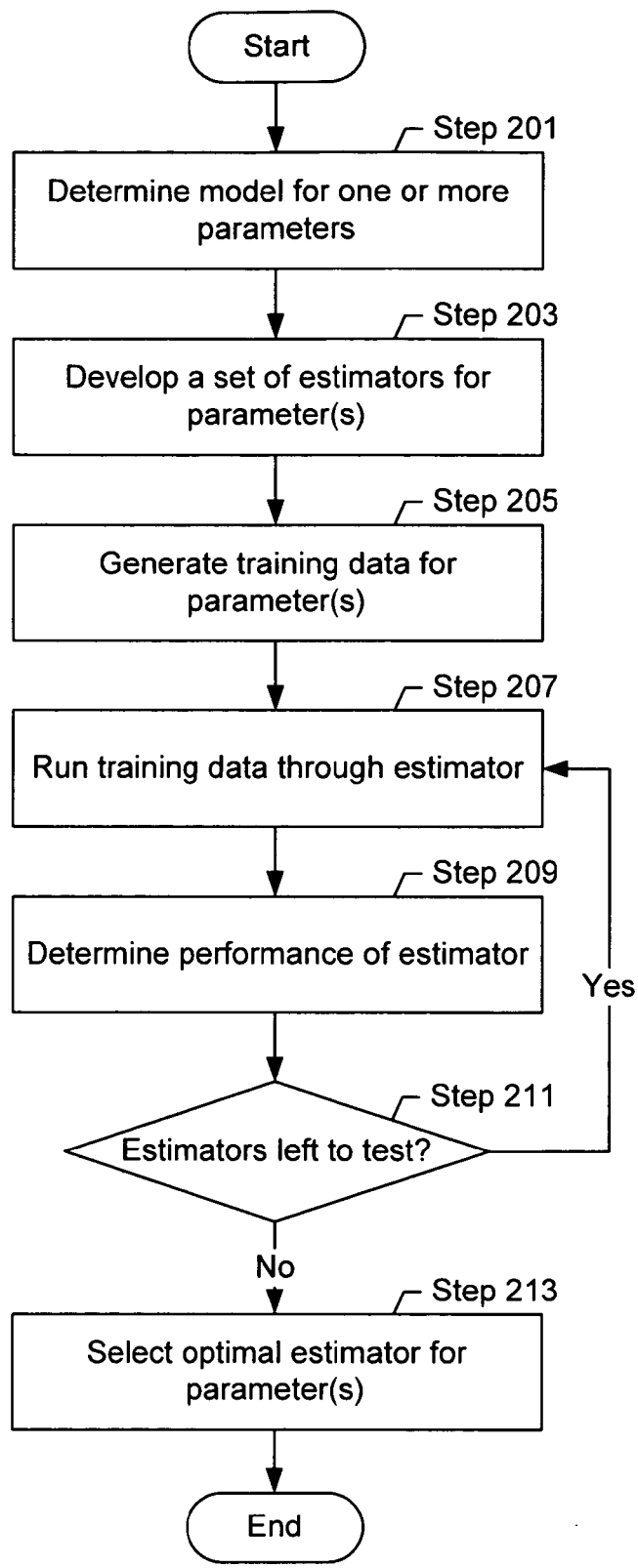
FIGS. 2-3 show flow diagrams in accordance with one or more embodiments of the invention.

FIG. 2 shows a flow diagram of an internal estimator setup in accordance with one or more embodiments of the invention. In one or more embodiments of the invention, one or more of the steps described below may be omitted, repeated, and/or performed in a different order. Accordingly, the specific arrangement of steps shown in FIG. 2 should not be construed as limiting the scope of the invention.

Initially, a model for one or more parameters is determined (Step 201). As mentioned previously, the model may correspond to a probability mass function that specifies the distribution of statistical data samples that reflect particular parameter values. Example parameter values include packet sizes of 20, 50, 100, 500, and 1000 bytes, fixed or variable inter-arrival type, etc. The probability mass function may take into account any noise that occurs in the statistical data samples. For example, packet inter-arrival times may be delayed by various system glitches or additional processing by the application. In such cases, the model may be designed to take into account the possible delays and incorporates the delays in determining how the statistical data samples will be distributed.

A set of estimators is then developed for the parameter(s) in the model (Step 203). For example, a minimum mean squared error estimator, maximum likelihood estimator, minimum variance unbiased estimator, and other estimators may be developed. In one or more embodiments of the invention, each estimator includes an estimator function, such as a mean squared error function, likelihood function, posterior distribution function, etc. that determines how well the statistical data samples fit each of the parameter values.

Training data is also developed for the parameter(s) (Step 205). As stated above, training data may be obtained from packets sent by actual network applications, such as VoIP applications, FTP applications, etc. The training data is analyzed by each estimator (Step 207) to determine the performance of the estimator (Step 209). For example, the performance of an estimator may be analyzed by determining how well an estimate from the estimator correlates with actual conditions. In other words, an estimator that estimates average packet size to be 50 bytes when the average packet size of an application is close to 100 bytes is likely performing badly, whereas an estimator that estimates a packet size of close to 100 bytes is performing well.

A determination is then made about whether any estimators are left to test (Step 211). If additional estimators remain, steps 207-209 are repeated for the remaining additional estimators until all estimators have been tested. An optimal estimator from the set is selected as an internal estimator for the parameter(s) (Step 213). Those skilled in the art will appreciate that different estimators produce more or less optimal results depending on conditions, such as sample size, characteristics of the noise, etc. As a result, different estimators may be selected for different models, depending on the nature of the application, model, and parameter(s).

Figure 3:
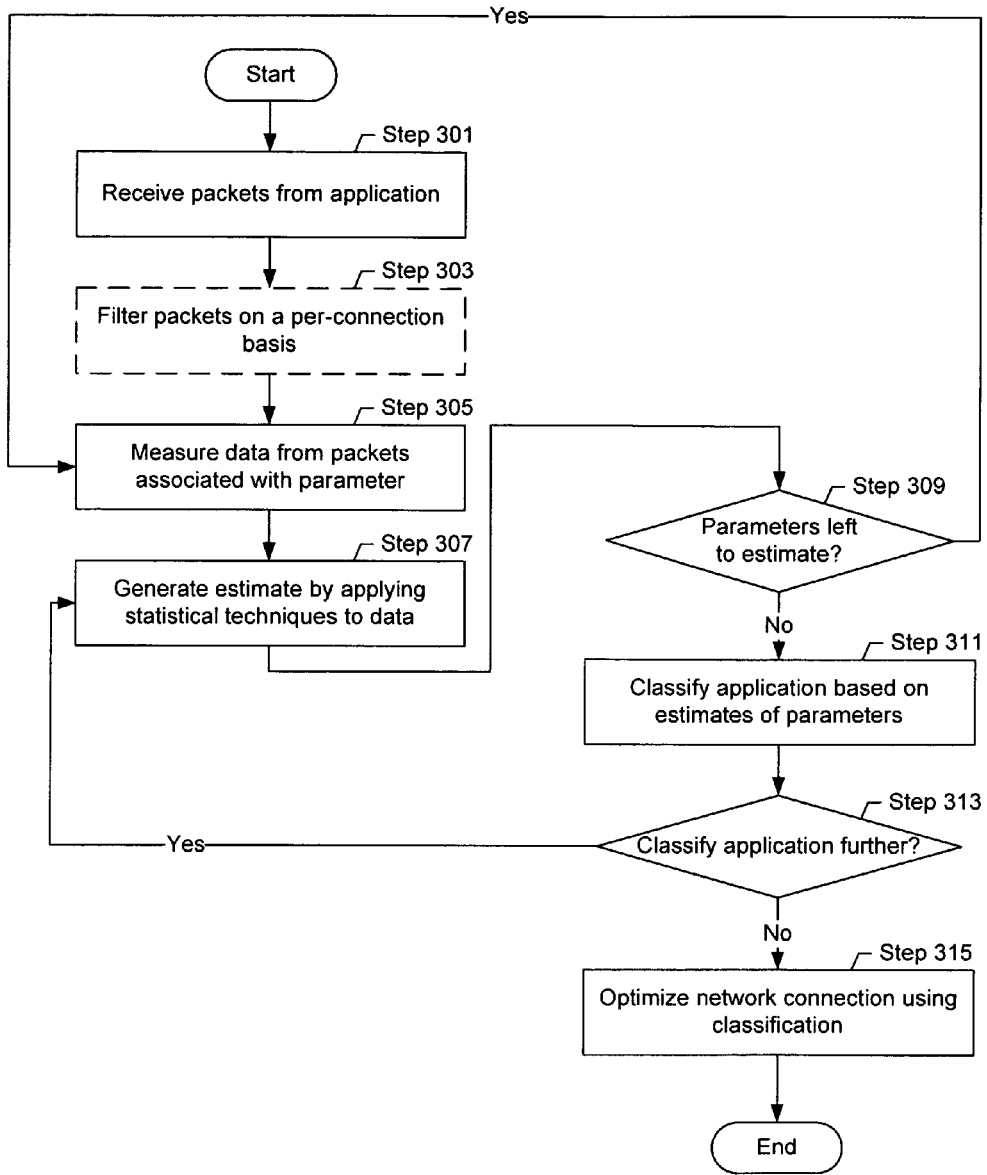

FIG. 3 shows a flow diagram of an application classification in accordance with one or more embodiments of the invention. In one or more embodiments of the invention, one or more of the steps described below may be omitted, repeated, and/or performed in a different order. Accordingly, the specific arrangement of steps shown in FIG. 3 should not be construed as limiting the scope of the invention.

Initially, packets are received from an application (Step 301). As mentioned previously, the packets may be received in a kernel of the system on which the application is executing en route to a network, where the packets are transmitted to another computer on the network. In the kernel, the packets may be optionally filtered on a per-connection basis (Step 303). The filtering may allow the application to be classified based on different usage habits associated with each network connection. For example, one user may use the application to primarily upload data, whereas another user may use the application to primarily download data. As a result, the usage habits of both users affect the packet transmission patterns of the application, and filtering based on each user's connection with the application may allow both the network connections and the application to be classified more accurately.

Data from the packets associated with the parameter is measured (Step 305). For example, if the parameter refers to average packet size, the packets are examined to determine the size of each packet. The measured data may be stored in data structures internal to the internal estimators, or the measured data may be stored in a location external to the internal estimators (e.g., a database) further processing by other applications or processes. An estimate is then generated by applying statistical techniques to the measured data (Step 307). As discussed above, the statistical techniques may depend on the type of estimator used. Further, the estimate may be generated by fitting the data to one or more parameters to determine which set of parameter values has the best fit. In the case of average packet size, a minimum mean squared error estimator may be used, for example, to determine an average packet size that minimizes the mean squared error between the data and the actual average packet size.

The process of measuring data (Step 305) and generating an estimate from the data (Step 307) is repeated depending on if other parameters are left to estimate (Step 309). When estimates for all parameters have been obtained, the application is classified based on the estimates (Step 311). Optionally, as mentioned above, the application may also be classified using constrained histograms and/or external information as described above in FIG. 1. For example, the application may be classified as a VoIP application using one or more estimates, constrained histograms, and/or external information by a linear classifier, quadratic classifier, neural network, Bayesian network, etc.

At this stage, a determination is made about whether the application needs to be further classified (Step 313). In one or more embodiments of the invention, the application may be classified generally or specifically. For example, an application may be generally classified as a VoIP application. However, if more information about the application is needed, more estimates can be generated (Steps 305-309) and a more specific classification obtained (Step 311). For example, a VoIP application may further be classified as a VoIP application with a specific codec, such as ITU-T G.729 or ITU-T G.711.

Once the application has been classified to a sufficient degree of specificity, the classification may be used to optimize a network connection associated with the application (Step 315). For example, the classification may be used to select a congestion control algorithm for the application and/or network connection, tune a network stack associated with the application, select a path for the packets to travel over, etc. Once the network connection is optimized, the performance of the network connection may be used to update one or more internal estimators and/or the classifier. For example, if a congestion control algorithm has been selected for an application based on an estimated average packet size of 1500 bytes, but the actual application is a VoIP application with an average packet size of 100 bytes, the performance of the congestion control algorithm may be decreased and the estimator of average packet size may be adjusted accordingly.

Figure 4:
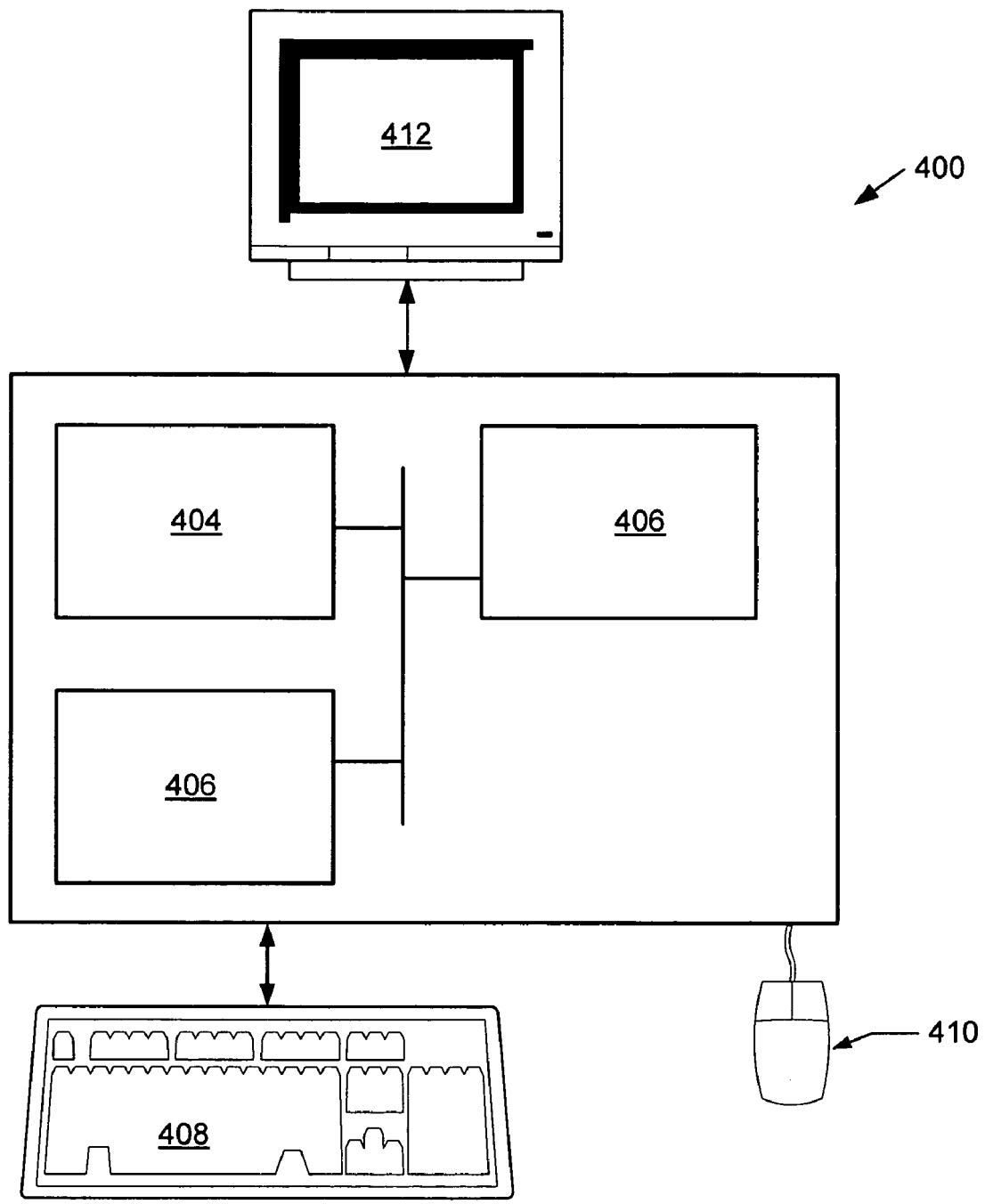
FIG. 4 shows a computer system in accordance with one or more embodiments of the invention.

The invention may be implemented on virtually any type of computer regardless of the platform being used. For example, as shown in FIG. 4, a computer system (400) includes a processor (402), associated memory (404), a storage device (406), and numerous other elements and functionalities typical of today's computers (not shown). The computer (400) may also include input means, such as a keyboard (408) and a mouse (410), and output means, such as a monitor (412). The computer system (400) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (400) may be located at a remote location and connected to the other elements over a network. Further, the invention may be implemented on a distributed system having a plurality of nodes, where each portion of the invention (e.g., application, kernel, internal estimators, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for classifying an application, comprising:
   receiving, at a kernel, a plurality of packets from the application, wherein the application is executing outside of the kernel;
   obtaining a first measurement from the plurality of packets associated with a first parameter using a first internal estimator in the kernel;
   applying a first statistical technique to the first measurement to generate a first estimate of the first parameter; and obtaining a classification of the application based on the first estimate,
wherein the classification of the application is used to optimize a network connection associated with the application,
wherein the application and the kernel are located in a computer system,
wherein the application uses the network connection to send the plurality of packets to a packet destination external to the computer system.

2. The method of claim 1, further comprising:
obtaining a second measurement from the plurality of packets associated with a second parameter using a second internal estimator in the kernel;
applying a second statistical technique to the second measurement to generate a second estimate of the second parameter; and
refining the classification based on the second estimate.

3. The method of claim 1, further comprising:
analyzing a performance of the network connection; and
updating the first internal estimator based on the performance of the network connection.

4. The method of claim 1, further comprising:
updating the classification based on external information about the application.

5. The method of claim 1, wherein the classification is made using at least one selected from a group consisting of a principal component analysis, a linear discriminant analysis, a non-linear discriminant analysis, a Fisher discriminant, and an expectation maximization.

6. The method of claim 1, wherein the first internal estimator comprises a minimum mean squared error estimator.

7. The method of claim 1, wherein the network connection is associated with a user of the application.

8. A system, comprising:
a processor;
an application executed by the processor and configured to send a plurality of packets to a kernel executed by the processor;
the kernel, comprising:
  a first internal estimator; and
  a classifier,
wherein the first internal estimator is associated with a first parameter and configured to:
  obtain a first measurement from the plurality of packets, wherein the first measurement is associated with the first parameter; and
  generate a first estimate associated with the first parameter based on the first measurement,
wherein the classifier is configured to generate a classification of the application based on the first estimate, and
wherein the classification of the application is used to optimize a network connection associated with the application,
wherein the application uses the network connection to send the plurality of packets to a packet destination external to the system.

9. The system of claim 8, wherein the first internal estimator comprises a minimum mean squared error estimator.

10. The system of claim 8, wherein the first estimate is generated using a statistical technique.

11. The system of claim 10, wherein the classification is made using at least one selected from a group consisting of a principal component analysis, a linear discriminant analysis, a non-linear discriminant analysis, a Fisher discriminant, and an expectation maximum.

12. The system of claim 8, wherein the network connection is associated with a user of the application.

13. The system of claim 8, wherein the kernel further comprises:
a second internal estimator associated with a second parameter and configured to:
  obtain a second measurement from the plurality of packets, wherein the second measurement is associated with the second parameter; and
  generate a second estimate associated with the second parameter based on the second measurement,
wherein the classifier is configured to refine the classification based on the second estimate.

14. The system of claim 8, wherein the classifier is updated with external information related to the application.

15. A non-transitory computer readable medium containing software instructions embodied therein for causing a computer system to perform a method for emulating a system call, the method comprising:
receiving, at a kernel, a plurality of packets from the application, wherein the application is executing outside of the kernel;
obtaining a first measurement from the plurality of packets associated with a first parameter using a first internal estimator in the kernel;
applying a first statistical technique to the first measurement to generate a first estimate of the first parameter; and
obtaining a classification of the application based on the first estimate,
wherein the classification of the application is used to optimize a network connection associated with the application,
wherein the application and the kernel are located in a computer system,
wherein the application uses the network connection to send the plurality of packets to a packet destination external to the computer system.

16. The non-transitory computer readable medium of claim 15, the method further comprising:
obtaining a second measurement from the plurality of packets associated with a second parameter using a second internal estimator in the kernel;
applying a second statistical technique to the second measurement to generate a second estimate of the second parameter; and
refining the classification based on the second estimate.

17. The non-transitory computer readable medium of claim 15, the method further comprising:
analyzing a performance of the network connection; and
updating the first internal estimator based on the performance of the network connection.

18. The non-transitory computer readable medium of claim 15, the method further comprising:
updating the classification based on external information about the application.

19. The non-transitory computer readable medium of claim 15, wherein the classification is made using at least one selected from a group consisting of a principal component analysis, a linear discriminant analysis, a non-linear discriminant analysis, a Fisher discriminant, and an expectation maximum.

20. The non-transitory computer readable medium of claim 15, wherein the network connection is associated with a user of the application.

* * * * *